United States Patent
Benveniste (10) Patent No.: US 8,036,200 B2
(45) Date of Patent: Oct. 11, 2011

(54) EFFICIENT POLLED FRAME EXCHANGE ON A SHARED-COMMUNICATIONS CHANNEL

(75) Inventor: Mathilde Benveniste, South Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1072 days.

(21) Appl. No.: 10/672,604

(22) Filed: Sep. 26, 2003

(65) Prior Publication Data

US 2004/0141489 A1    Jul. 22, 2004

Related U.S. Application Data (60) Provisional application No. 60/441,160, filed on Jan. 21, 2003.

(51) Int. Cl.
*H04J 3/00* (2006.01)
(52) U.S. Cl. ........ 370/345; 370/346; 370/347; 370/348; 370/349; 455/445
(58) Field of Classification Search .................. 370/345, 370/346, 347, 348, 349, 394, 395, 455
See application file for complete search history.

(56) References Cited

U.S. PATENT DOCUMENTS

| | | | |
|---|---|---|---|
| 3,601,249 A * | 8/1971 | Larsson | 206/579 |
| 5,297,144 A | 3/1994 | Gilbert | |
| 5,940,771 A | 8/1999 | Gollnick | |
| 6,289,482 B1 * | 9/2001 | Joshi et al. | 714/748 |
| 6,459,687 B1 | 10/2002 | Bourlas | |
| 2002/0118667 A1 * | 8/2002 | Chintada et al. | 370/349 |
| 2003/0161340 A1 * | 8/2003 | Sherman | 370/445 |
| 2004/0037320 A1 * | 2/2004 | Dickson | 370/473 |
| 2004/0085945 A1 * | 5/2004 | Takabatake et al. | 370/338 |
| 2004/0120292 A1 * | 6/2004 | Trainin | 370/338 |

* cited by examiner

*Primary Examiner* — Patrick Edouard
*Assistant Examiner* — Fred Casca
(74) *Attorney, Agent, or Firm* — Chapin IP Law, LLC; David W. Rouille, Esq.

(57) ABSTRACT

A technique is disclosed for dealing with transmissions between telecommunications stations on a shared-communications channel that avoids some of the costs and disadvantages for doing so in the prior art. The present invention introduces transmission rules that alleviate timing constraints. By following the transmission rules in accordance with the illustrative embodiment of the present invention, stations exchanging data with each other can prepare frames for transmission far enough in advance to overcome timing constraints.

18 Claims, 8 Drawing Sheets

EFFICIENT POLLED FRAME EXCHANGE ON A SHARED-COMMUNICATIONS CHANNEL

CROSS-REFERENCE TO RELATED APPLICATIONS

This application claims the benefit of U.S. Provisional Patent Application Ser. No. 60/441,160, entitled "Efficient Polling, Poll Scheduling and Power Saving," filed on Jan. 21, 2003, which is incorporated by reference.

FIELD OF THE INVENTION

The present invention relates to telecommunications in general, and, more particularly, to local area networks.

BACKGROUND OF THE INVENTION

Figure 1:
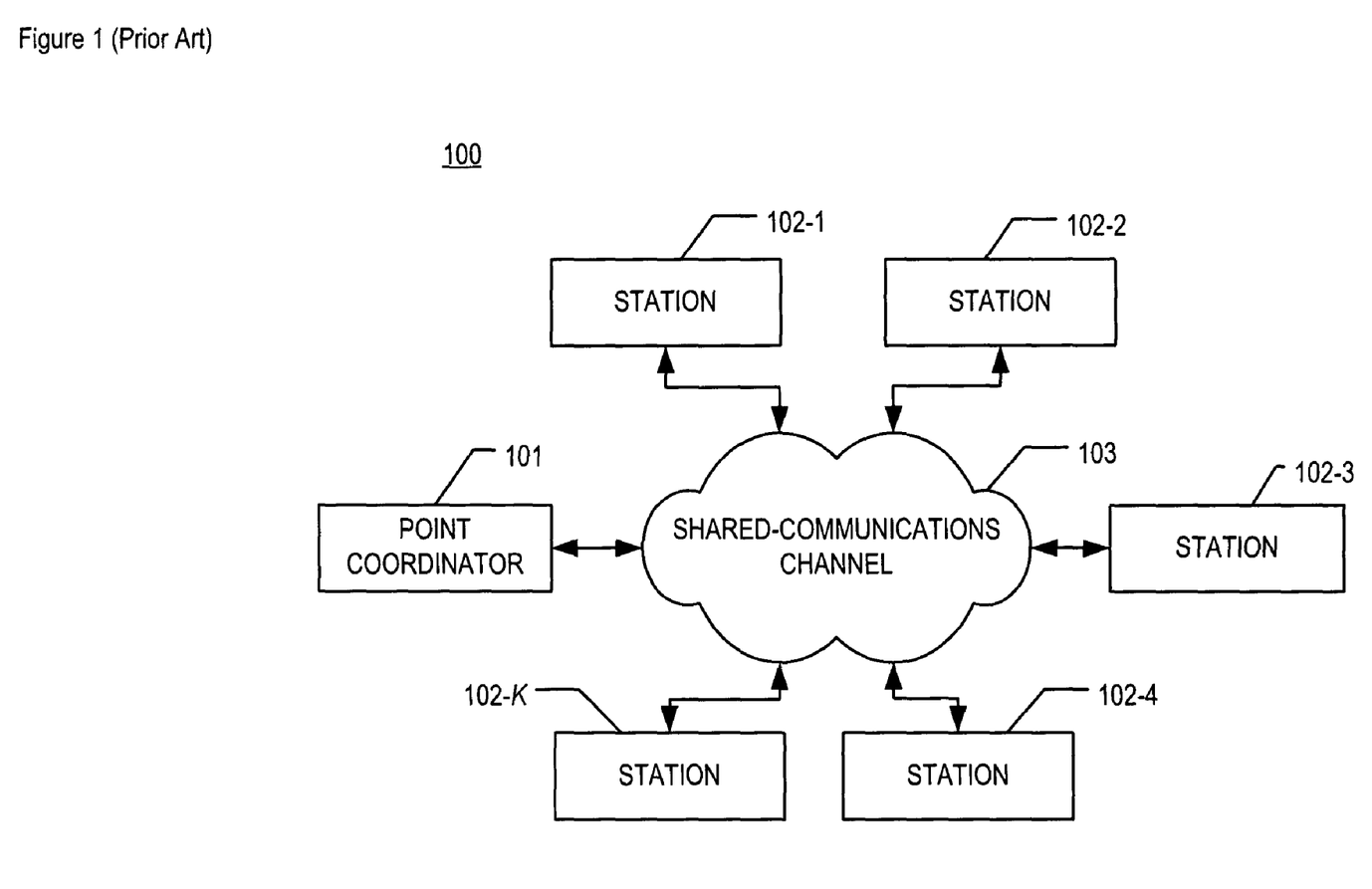
FIG. 1 depicts a schematic diagram of wireless local area network 100 in the prior art.

FIG. 1 depicts a schematic diagram of local area network 100 in the prior art, which comprises point coordinator 101; telecommunication stations 102-1 through 102-K, wherein K is a positive integer; and shared-communications channel 103, interconnected as shown. Stations 102-1 through 102-K enable associated host computers to communicate. Point coordinator 101, a specialized station, enables stations 102-1 through 102-K to communicate with each other.

Each station in local area network 100 is able to transmit into shared-communications channel 103 a block of data called a "frame" to another station. To transmit the frame, the station has to follow a standard procedure to gain access to shared-communications channel 103. A centralized polling protocol is one such procedure.

In a centralized polling protocol, point coordinator 101 sends polls to stations 102-1 through 102-K, granting them opportunities to transmit. Each polled station may transmit its buffered frames, each frame being acknowledged by point coordinator 101. If point coordinator 101 has buffered frames destined for a polled station, station 102-3 as an example, point coordinator 101 may transmit these frames together with the poll. Since each station transmits only upon receiving a poll, transmission is contention-free.

To improve the efficiency of frame exchange, according to the protocol, a transmitting station may combine in the same frame i) acknowledgements to a received frame and ii) data transfers. This is called "piggybacking." Similarly, point coordinator 101 may also "piggyback" acknowledgements and data transfers, as well as polls, in the same frame. For example, during a frame exchange with point coordinator 101, station 102-3 may piggyback an acknowledgement with a data transfer in the same frame if point coordinator 101 had previously transmitted a frame comprising data to station 102-3. (The acknowledgement is necessary because the previously transmitted frame comprising data requires an acknowledgement.)

Polling protocols require that frames be exchanged within a specified time interval. If the recipient does not acknowledge transmission within the time interval, the source will repeat the transmission. The problem is that the requirement can become difficult to meet if the response frame necessitates computationally intensive processing before transmission. For example, if the acknowledgement is to be piggybacked with a poll or data or both, the time required to generate the combined frame and encrypt it might be longer than the specified time interval.

What is needed is a technique that deals with polled data exchanges between stations without some of the costs and disadvantages of doing so in the prior art.

SUMMARY OF THE INVENTION

The present invention provides a technique for dealing with transmissions between telecommunications stations on a shared-communications channel that avoids some of the costs and disadvantages of doing so in the prior art. The present invention introduces transmission rules that alleviate timing constraints. By following the transmission rules in accordance with the illustrative embodiment of the present invention, stations exchanging data with each other can prepare frames for transmission far enough in advance to overcome timing constraints.

A point coordinator, in some embodiments of the present invention, transmits all of the frames to a polled station one at a time and piggybacked with sequential polls, wherein some or all of the frames have been generated and stored in advance of receiving the corresponding frames from the polled station. Following the first frame, all subsequent frames comprise an acknowledgement and possibly data. The polled station might not require receiving an acknowledgement in a given frame and ignores the acknowledgement if it receives one. Generating a frame with the acknowledgement, however, enables the point coordinator to prepare the frame in advance, since the polled station might require the acknowledgement. In some embodiments, the point coordinator in advance of receiving the corresponding frames from the polled station can also perform additional processing of the frame, such as encrypting one or more of the frame bits.

The polled station, in other embodiments, transmits all of the frames to the point coordinator one at a time, wherein some or all of the frames have been generated and stored in advance of receiving the corresponding frames from the point coordinator. When the polled station receives a data frame piggybacked to a poll, the station sends to the point coordinator an acknowledgement piggybacked to a data frame if the station has data to be sent. When the station receives an acknowledgement with a poll, the station still sends an acknowledgement piggybacked to a frame. The point coordinator might not require receiving an acknowledgement in a given frame and ignores the acknowledgement if it receives one. Generating a frame with the acknowledgement, however, enables the polled station to prepare the frame in advance, since the point coordinator might require the acknowledgement. In some embodiments, the station in advance of receiving the corresponding frames from the point coordinator can also perform additional processing of the frame, such as encrypting one or more of the frame bits.

An illustrative embodiment of the present invention comprises: a processor for generating a first frame comprising a data payload and an acknowledgement; and a receiver for receiving via a shared-communications channel a second frame after the generating; wherein the acknowledgement is intended as a response to the second frame.

DETAILED DESCRIPTION

Figure 2:
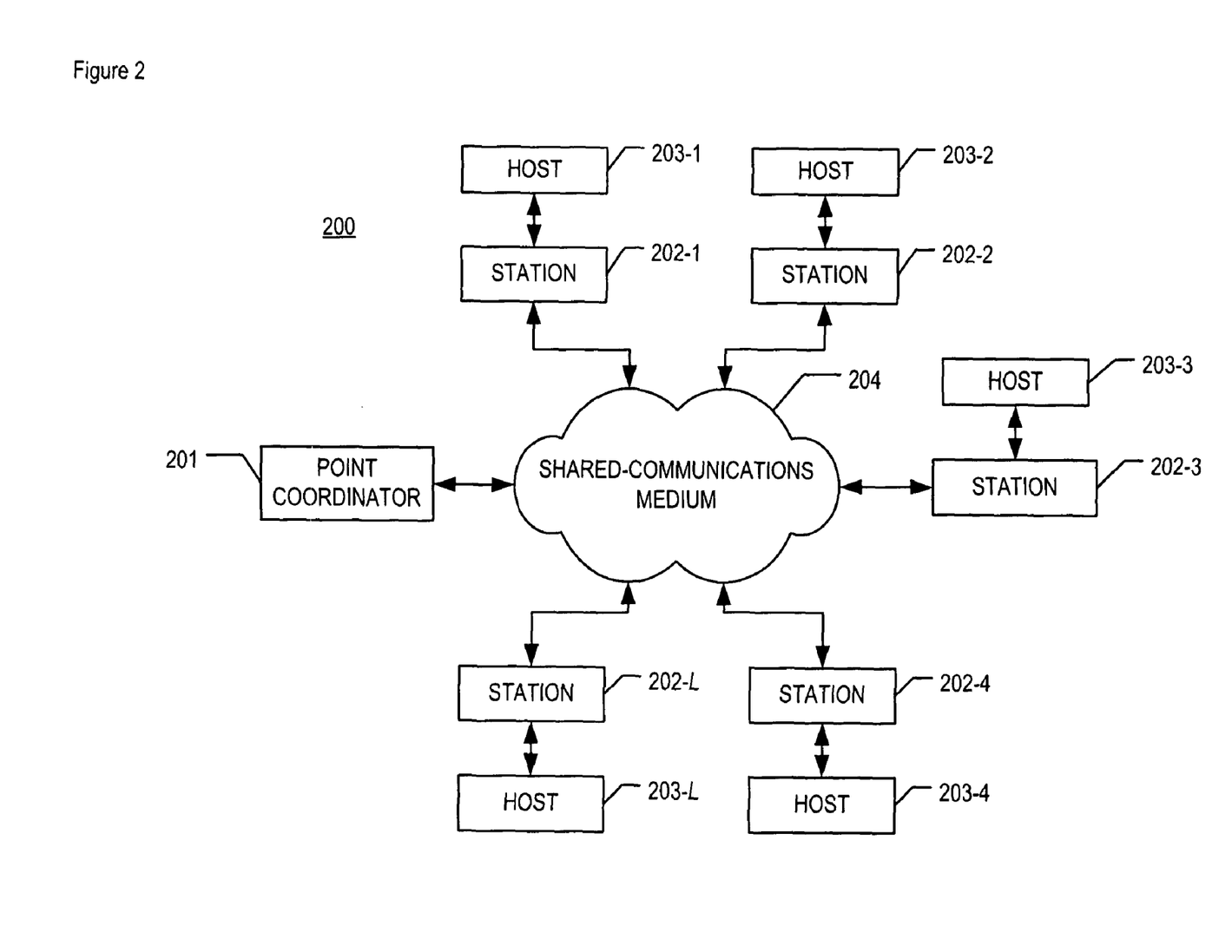
FIG. 2 depicts a schematic diagram of a portion of local area network 200 in accordance with the illustrative embodiment of the present invention.

FIG. 2 depicts a schematic diagram of local area network 200 in accordance with the illustrative embodiment of the present invention. Local area network 200 operates in accordance with a set of protocols (e.g., IEEE 802.11, etc.). Local area network 200 comprises point coordinator 201; stations 202-1 through 202-L, wherein L is a positive integer; host computers 203-1 through 203-L, wherein L is a positive integer; and shared-communications channel 204, interconnected as shown. It will be clear to those skilled in the art how to make and use shared-communications channel 204.

Point coordinator 201 coordinates communication by polling stations 202-1 through 202-L to determine if they need to transmit frames.

Station 202-i is capable of receiving data payloads from host computer 203-i and transmitting over shared-communications channel 204 frames comprising the data received from host computer 203-i. Station 202-i is also capable of receiving frames from shared communications channel 204 and sending to host computer 203-i data payloads comprising data from the frames. It will be clear to those skilled in the art, after reading this specification, how to make and use station 202-i.

Host computer 203-i is capable of generating data payloads and transmitting those data payloads to station 202-i. Host computer 203-i is also capable of receiving data payloads from station 202-i and of processing and using the data contained within those data payloads. Host computer 203-i can be, for example, a desktop computer, a laptop computer, a handheld digital assistant, or a packet-data-based telephone that uses local area network 200 to communicate with other host computers and devices. It will be clear to those skilled in the art how to make and use host computer 203-i.

Figure 3:
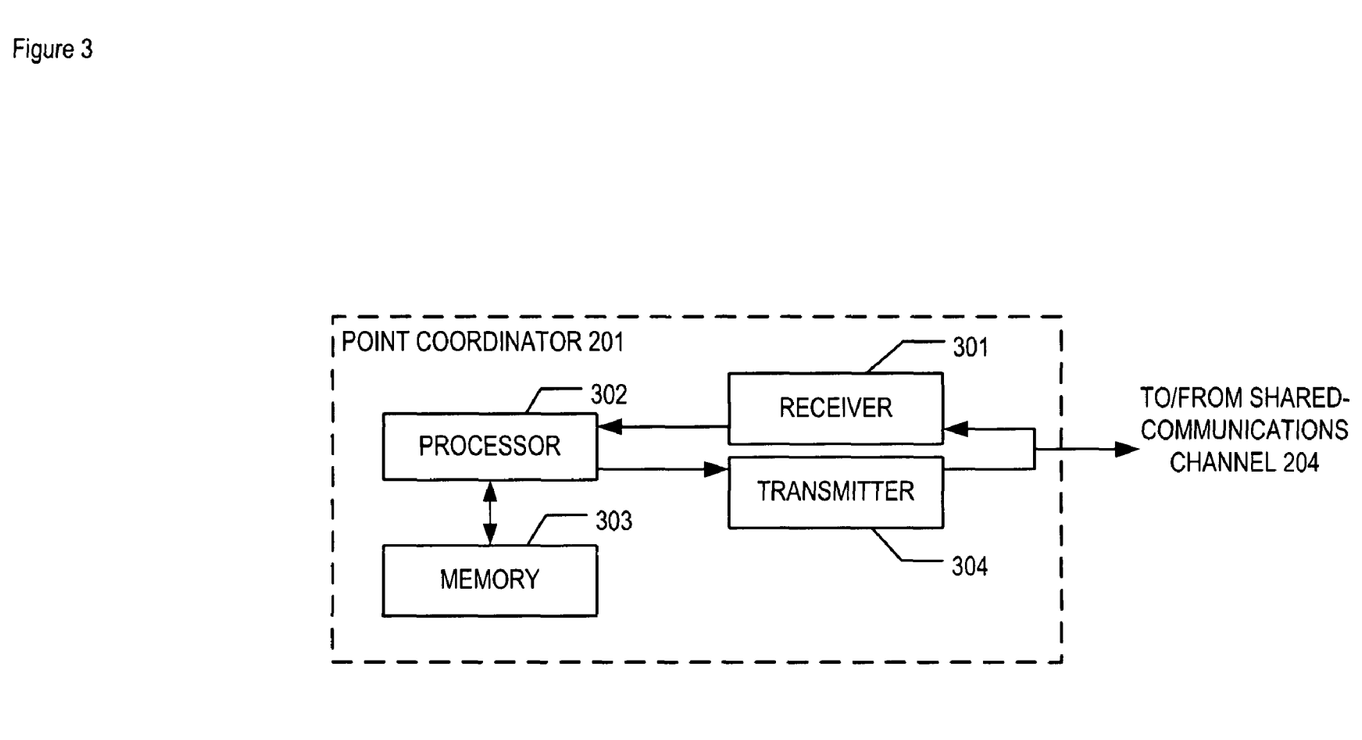
FIG. 3 depicts a block diagram of the salient components of point coordinator 201 in accordance with the illustrative embodiment of the present invention.

FIG. 3 depicts a block diagram of the salient components of point coordinator 201 in accordance with the illustrative embodiment of the present invention. Point coordinator 201 comprises receiver 301, processor 302, memory 303, and transmitter 304, interconnected as shown.

Receiver 301 is a circuit that is capable of receiving frames from shared-communications channel 204 in well-known fashion, and of forwarding them to processor 302. It will be clear to those skilled in the art how to make and use receiver 301.

Processor 302 is a general-purpose processor that is capable of performing the tasks described below and with respect to FIGS. 6 through 8. It will be clear to those skilled in the art, after reading this specification, how to make and use processor 302.

Memory 303 is capable of storing programs and data used by processor 302. In particular, memory 303 can store frames that are generated ahead of time until the appropriate transmission times. It will be clear to those skilled in the art, after reading this specification, how to make and use memory 303.

Transmitter 304 is a circuit that is capable of receiving frames from processor 302, in well-known fashion, and of transmitting them on shared-communications channel 204. It will be clear to those skilled in the art how to make and use transmitter 304.

Point coordinator 201 transmits all of the frames stored for station 202-i one at a time and piggybacked with sequential polls. Following the first frame, which might or might not comprise data, all subsequent frames comprise an acknowledgement and possibly data. Station 202-i might not require receiving an acknowledgement in a given frame, but generating a frame with the acknowledgment enables the frame to be prepared in advance. If point coordinator 201 has no data to send or when point coordinator 201 has transmitted all of its prepared and stored frames comprising data that are intended for station 202-i, point coordinator 201 sends a poll frame, a poll-plus-acknowledgement frame, or an acknowledgement frame.

When point coordinator 201 receives a frame comprising data from station 202-i, point coordinator 201 responds with either i) a data-plus-acknowledgement-plus-poll frame if there is stored data or ii) an acknowledgement-plus-poll frame otherwise. If point coordinator 201 has no frames stored when it receives a null-plus-acknowledgement frame from station 202-i, point coordinator 201 responds with an acknowledgement frame. A null frame (regardless of whatever else the frame comprises) is a data frame of subtype "null" and has no data payload.

In some networks, point coordinator 201 is alternatively referred to as a "hybrid coordinator." In other networks, the functionality that embodies point coordinator 201 resides within an access point. It will be clear to those skilled in the art how to make and use an access point.

Figure 4:
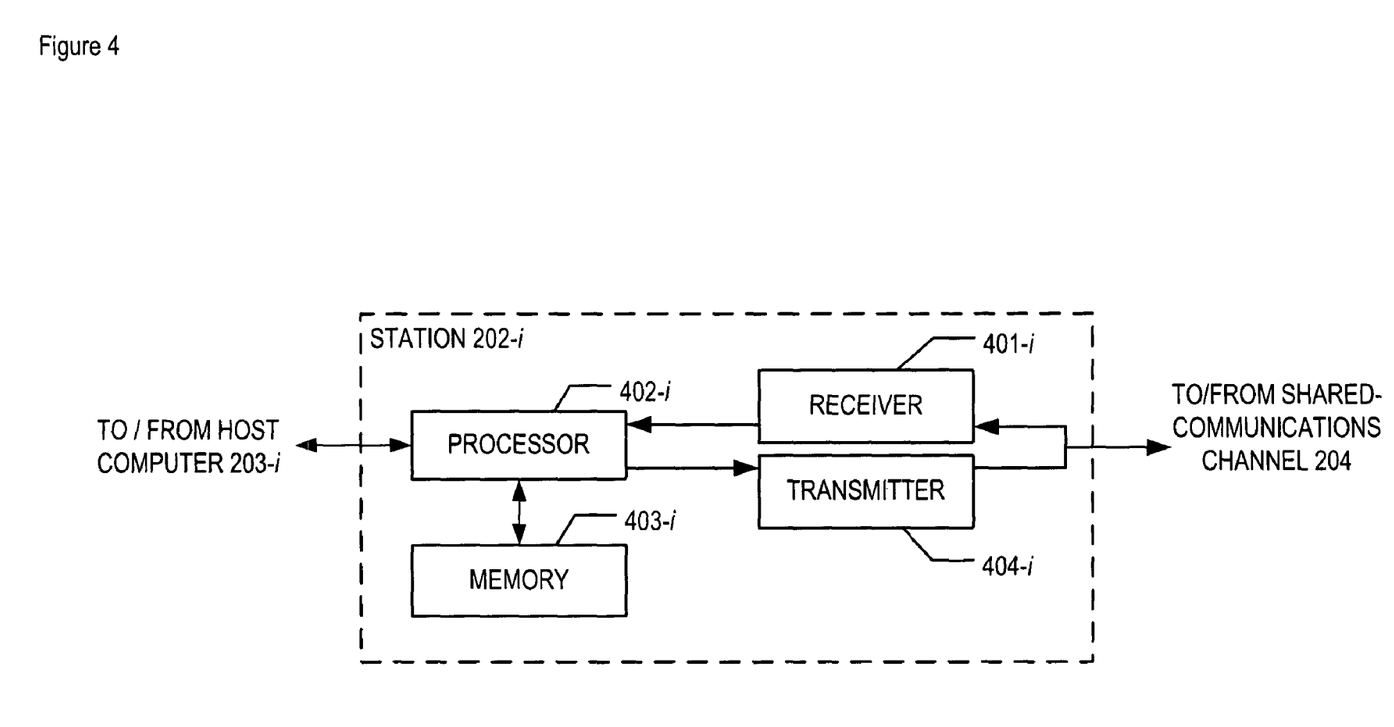
FIG. 4 depicts a block diagram of the salient components of station 202-i in accordance with the illustrative embodiment of the present invention.

FIG. 4 depicts a block diagram of the salient components of station 202-i in accordance with the illustrative embodiment of the present invention. Station 202-i comprises receiver 401-i, processor 402-i, memory 403-i, and transmitter 404-i, interconnected as shown.

Receiver 401-i is a circuit that is capable of receiving frames from shared-communications channel 204, in well-known fashion, and of forwarding them to processor 402-i. It will be clear to those skilled in the art how to make and use receiver 401-i.

Processor 402-i is a general-purpose processor that is capable of performing the tasks described below and with respect to FIGS. 5 through 8. It will be clear to those skilled in the art, after reading this specification, how to make and use processor 402-i.

Memory 403-i is capable of storing programs and data used by processor 402-i. In particular, memory 403-i can store frames that are generated ahead of time until the appropriate transmission times. It will be clear to those skilled in the art, after reading this specification, how to make and use memory 403-i.

Transmitter 404-i is a circuit that is capable of receiving frames from processor 402-i, in well-known fashion, and of transmitting them on shared-communications channel 204. It will be clear to those skilled in the art how to make and use transmitter 404-i.

When station 202-i receives a data frame piggybacked to a poll, station 202-i sends either i) an acknowledgement piggybacked to a data frame to point coordinator 201, if there is a frame comprising data stored at the station, or ii) a null-plus-acknowledgement frame. When station 202-i receives an acknowledgement with a poll, station 202-i responds with either i) an acknowledgement piggybacked to a frame, if there is a frame comprising data that is stored, or ii) a null-plus-acknowledgement frame. Point coordinator 201 might not require receiving an acknowledgement in a given frame, but generating a frame with the acknowledgment enables the frame to be prepared in advance.

Figure 5:
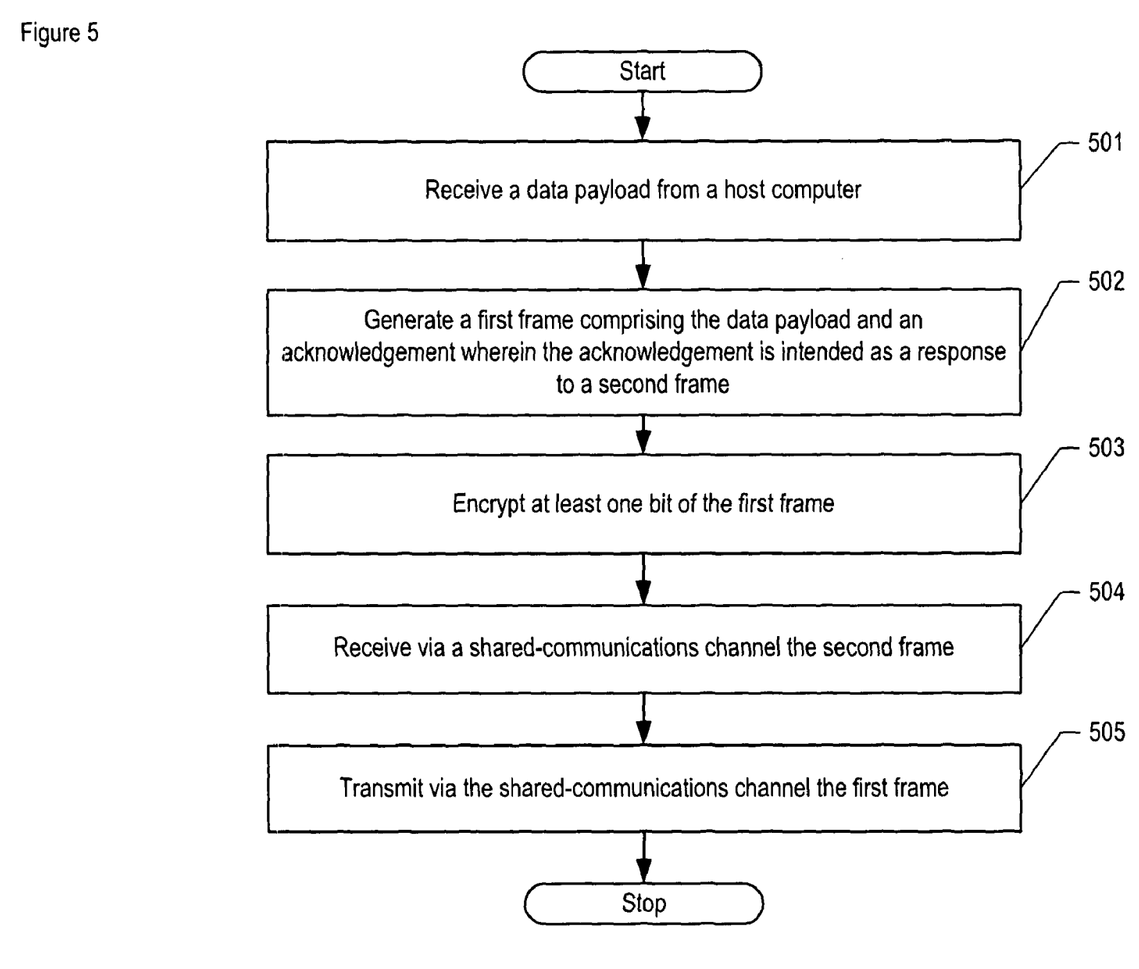
FIG. 5 depicts a flowchart of the salient tasks performed by station 202-i in accordance with the illustrative embodiment of the present invention.

FIG. 5 depicts a flowchart of the salient tasks performed by station 202-i (station 202-1 is used in the example) in accordance with the illustrative embodiment of the present invention. It will be clear to those skilled in the art which tasks depicted in FIG. 5 can be performed simultaneously or in a different order than that depicted. Furthermore, it will be clear to those skilled in the art, after reading this specification, how to perform the tasks depicted in FIG. 5 at point coordinator 201, alone or in combination with performing the tasks at station 202-i.

At task 501, in some embodiments, station 202-1 receives a data payload from host computer 203-i. In other embodiments, station 202-1 itself generates the data payload. It will be clear to those skilled in the art how to generate a data payload for a particular application.

At task 502, station 202-1 generates a first frame comprising the data payload and an acknowledgement frame. In some embodiments, the first frame also comprises a poll (e.g., when the station generating the frame is a point coordinator, etc.). The acknowledgement is intended as a response to a second frame that is yet to be received by station 202-1.

At task 503, in some embodiments, station 202-1 encrypts at least one bit of the first frame before receiving the second frame. In other embodiments, station 202-1 processes one or more bits of the first frame in a way other than encrypting, such as coding the bits, compressing the bits, filtering the bits, performing an application-specific operation on the bits, etc. In still other embodiments, station 202-1 does not perform any additional processing on the bits of the first frame.

At task 504, station 202-1 receives the second frame via shared-communications channel 204. In some embodiments, station 202-1 receives the second frame from point coordinator 201. In other embodiments, the second frame comprises an acknowledgement.

At task 505, station 202-1 transmits the first frame via shared-communications channel 204 after having received the second frame. In some embodiments, station 202-1 transmits the first frame to point coordinator 201.

Figure 6:
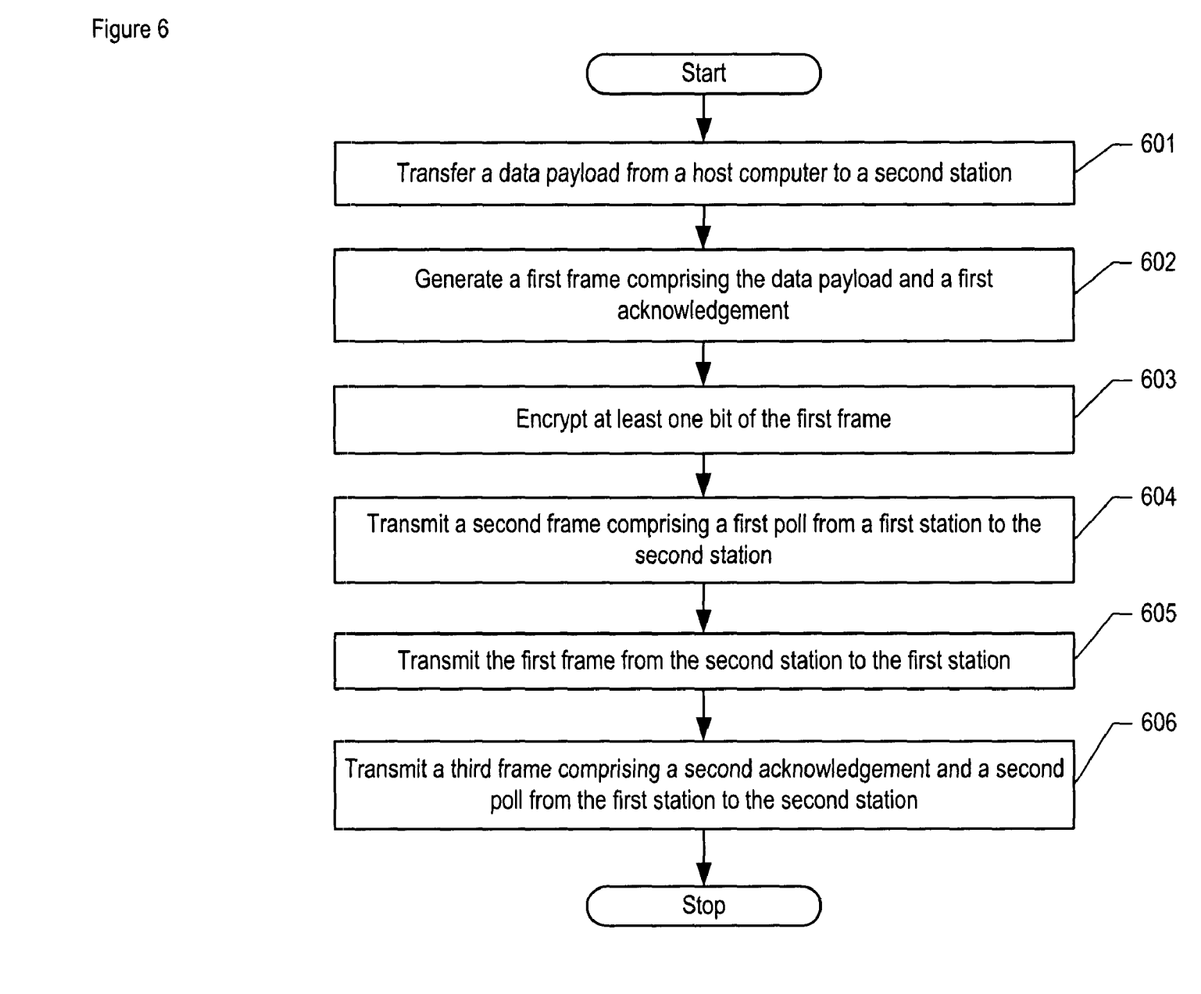
FIG. 6 depicts a flowchart of the salient tasks performed by local area network 200 in accordance with the illustrative embodiment of the present invention.

FIG. 6 depicts a flowchart of the salient tasks performed by local area network 200 in accordance with the illustrative embodiment of the present invention. For illustrative purposes, point coordinator 201 exchanges frames with station 202-2. It will be clear to those skilled in the art which tasks depicted in FIG. 6 can be performed simultaneously or in a different order than that depicted.

At task 601, in some embodiments, station 202-2 receives a data payload from host computer 203-i. In other embodiments, station 202-2 itself generates the data payload. It will be clear to those skilled in the art how to generate a data payload for a particular application.

At task 602, local area network 200 generates a first frame comprising the data payload and a first acknowledgement frame. The acknowledgement is intended as a response to a second frame that is yet to be received by station 202-2.

At task 603, in some embodiments, station 202-2 encrypts at least one bit of the first frame before receiving the second frame. In other embodiments, station 202-2 processes one or more bits of the first frame in a way other than encrypting, such as coding the bits, compressing the bits, filtering the bits, performing an application-specific operation on the bits, etc. In still other embodiments, station 202-2 does not perform any additional processing on the bits of the first frame.

At task 604, point coordinator 201 transmits a second frame comprising a first poll from point coordinator 201 to station 202-2 over shared-communications channel 204.

At task 605, station 202-2 transmits the first frame to point coordinator 201 over shared-communications channel 204. The first frame has been available since before the second frame was transmitted by point coordinator 201 (and received by station 202-2).

At task 606, point coordinator 201 transmits a third frame comprising a second acknowledgement and a second poll to station 202-2 over shared-communications channel 204. The third frame has been available since before the first frame was transmitted by station 202-2 (and received by point coordinator 201).

Figure 7:
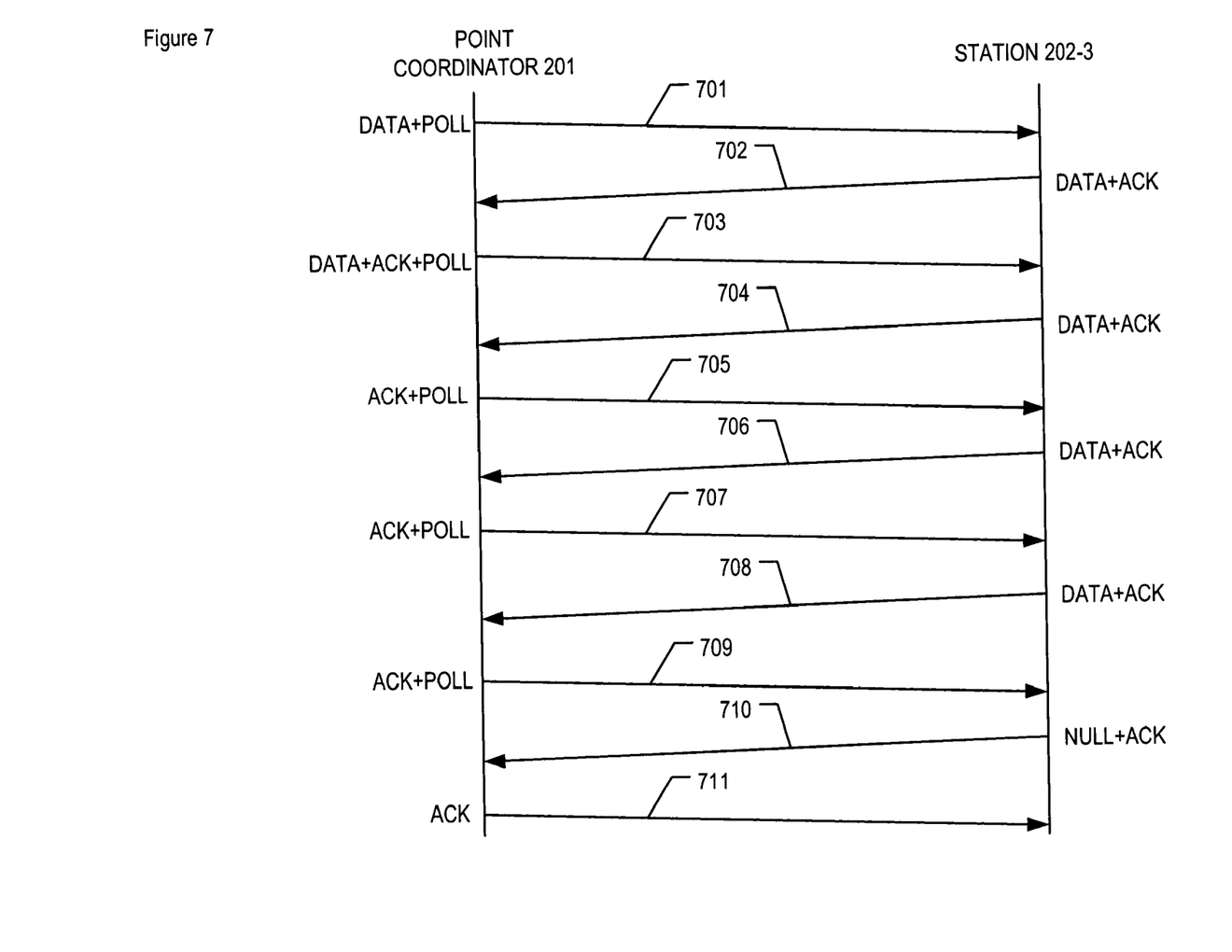
FIG. 7 depicts a first message flow diagram in accordance with the illustrative embodiment of the present invention.

FIG. 7 depicts a first message flow diagram in accordance with the illustrative embodiment of the present invention. Point coordinator 201 has two data frames that have been generated and stored, and are ready for transmission: frame 701 and frame 703. Frame 701 comprises data and a poll. Frame 703 comprises data, an acknowledgement, and a poll. Exemplary station 202-3 has five frames (including four data frames) that have been generated, are stored, and are ready for transmission: frame 702, frame 704, frame 706, frame 708, and frame 710. Frames 702, 704, 706, and 708 each comprise a data payload and an acknowledgement, and frame 710 comprises a null and an acknowledgement.

In other embodiments than the one described, at least one of the frames in the message flow is generated in response to having received another frame, instead of being generated ahead of time.

Point coordinator 201 and station 202-3 need to exchange their frames with each other. Point coordinator 201 initiates the exchange by transmitting frame 701 to station 202-3 over shared-communications channel 204. In addition to polling station 202-3, frame 701 conveys data.

Station 202-3 transmits frame 702 to point coordinator 201 over shared-communications channel 204. In addition to conveying data, frame 702 conveys an acknowledgement of the data transmitted in frame 701.

Point coordinator 201 transmits frame 703 to station 202-3. In addition to polling station 202-3, frame 703 conveys data and an acknowledgement of the data transmitted in frame 702.

Station 202-3 transmits frame 704 to point coordinator 201. In addition to conveying data, frame 704 conveys an acknowledgement of the data transmitted in frame 703.

Point coordinator 201 transmits frame 705 to station 202-3. In addition to polling station 202-3, frame 705 conveys an acknowledgement of the data transmitted in frame 704. Point coordinator 201 will send poll-plus-acknowledgement frames after transmitting all of its stored frames generated in advance until point coordinator 201 receives a frame comprising a null and an acknowledgement from station 202-3.

Station 202-3 transmits frame 706 to point coordinator 201. In addition to conveying data, frame 706 conveys an acknowledgement, even though station 202-3 did not receive data in frame 705. Point coordinator 201 ignores the redundant acknowledgement.

Point coordinator 201 transmits frame 707 to station 202-3. In addition to polling station 202-3, frame 707 conveys an acknowledgement of the data transmitted in frame 706.

Station 202-3 transmits frame 708 to point coordinator 201. In addition to conveying data, frame 708 conveys an acknowledgement, even though station 202-3 did not receive data in frame 707. Point coordinator 201 ignores the redundant acknowledgement.

Point coordinator 201 transmits frame 709 to station 202-3. In addition to polling station 202-3, frame 709 conveys an acknowledgement of the data transmitted in frame 708.

Station 202-3 transmits frame 710 to point coordinator 201. In addition to comprising a null, frame 710 conveys an acknowledgement, even though station 202-3 did not receive data in frame 709. Point coordinator 201 ignores the redundant acknowledgement.

Having received a frame conveying a null and an acknowledgement, and not having any more data to transmit, point coordinator 201 as a result transmits frame 711 to station 202-3. Frame 711 conveys an acknowledgement in response to frame 710.

Figure 8:
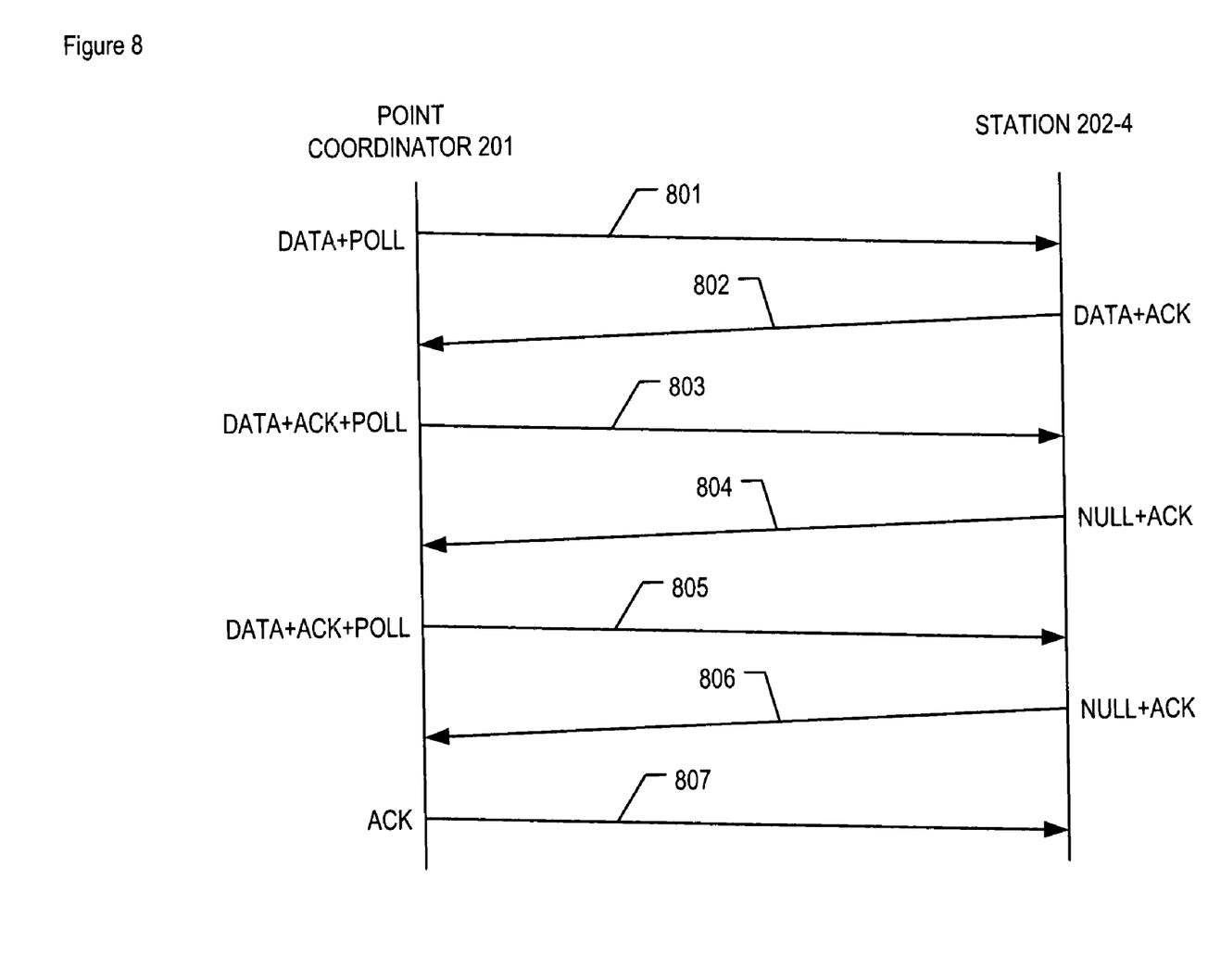
FIG. 8 depicts a second message flow diagram in accordance with the illustrative embodiment of the present invention.

FIG. 8 depicts a second message flow diagram in accordance with the illustrative embodiment of the present invention. Point coordinator 201 has three data frames that have been generated and stored, and are ready for transmission: frame 801, frame 803 and frame 805. Frame 801 comprises data and a poll. Frame 803 and 805 each comprise data, an acknowledgement, and a poll. Exemplary station 202-4 has two frames (including one data frame) that have been generated, are stored, and are ready for transmission: frame 802 and frame 804. Frame 802 comprises a data payload and an acknowledgement, and frame 804 comprises a null and an acknowledgement.

In other embodiments than the one described, at least one of the frames in the message flow is generated in response to having received another frame, instead of being generated ahead of time.

Point coordinator 201 and station 202-4 need to exchange their frames with each other. Point coordinator 201 initiates the exchange by transmitting frame 801 to station 202-4 over shared-communications channel 204. In addition to polling station 202-4, frame 801 conveys data.

Station 202-4 transmits frame 802 to point coordinator 201 over shared-communications channel 204. In addition to conveying data, frame 802 conveys an acknowledgement of the data transmitted in frame 801.

Point coordinator 201 transmits frame 803 to station 202-4. In addition to polling station 202-4, frame 803 conveys data and an acknowledgement of the data transmitted in frame 802.

Station 202-4 transmits frame 804 to point coordinator 201. In addition to comprising a null, frame 804 conveys an acknowledgement of the data transmitted in frame 803. Station 202-4 will transmit a frame comprising a null and an acknowledgment in response to each poll after station 202-4 transmits all of its stored data frames generated in advance to point coordinator 201.

Point coordinator 201 transmits frame 805 to station 202-4. In addition to polling station 202-4, frame 805 conveys data. Frame 805 also conveys an acknowledgement, even though point coordinator 201 did not receive data in frame 804. Station 202-4 ignores the redundant acknowledgement.

Station 202-4 transmits frame 806 to point coordinator 201. In addition to comprising a null, frame 806 conveys an acknowledgement of the data transmitted in frame 805.

Having received a frame conveying a null and an acknowledgement, and not having any more data to transmit, point coordinator 201 as a result transmits frame 807 to station 202-4. Frame 807 conveys an acknowledgement in response to frame 806.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. An apparatus comprising:
a receiver for receiving a first frame via a shared-communications channel; and
a processor for generating a second frame that comprises both a data payload and an acknowledgement of the receipt of said first frame and wherein, following the first frame, subsequent frames include an acknowledgement for frames requiring an acknowledgment as well as an acknowledgement for frames not requiring an acknowledgement, wherein said processor is also for one of the group consisting of coding at least one bit of said second frame, compressing at least one bit of said second frame, filtering at least one bit of said second frame and performing an application-specific operation on at least one bit of said second frame.

2. The apparatus of claim 1 wherein said processor is also for encrypting at least one bit of said second frame.

3. The apparatus of claim 1 further comprising a transmitter for transmitting said second frame via said shared-communications channel.

4. The apparatus of claim 1 further comprising a host interface for receiving said data payload from a host computer.

5. The apparatus of claim 1 wherein said second frame also comprises a poll.

6. The apparatus of claim 1 wherein said first frame comprises an acknowledgement of the receipt of a third frame.

7. An apparatus comprising:
(i) a first station for:
(a) transmitting a first frame comprising a first poll to a second station; and
(b) transmitting a second frame comprising a first acknowledgement and a second poll to said second station, wherein said second frame is available before a third frame is transmitted; and
(ii) said second station for:
(a) generating said third frame comprising a data payload and a second acknowledgement before said transmitting of said first frame; and
(b) transmitting said third frame to said first station wherein said third frame is available before said transmitting of said second frame and wherein, following a first frame, subsequent frames include an acknowledgement for frames requiring an acknowledgment as well as an acknowledgement for frames not requiring an acknowledgement, and wherein said processor is also for one of the group consisting of coding at least one bit of said second frame, compressing at least one bit of said second frame, filtering at least one bit of said second frame and performing an application-specific operation on at least one bit of said second frame.

8. The apparatus of claim 7 further comprising encrypting at least one bit of said third frame before said transmitting of said first frame.

9. The apparatus of claim 7 further comprising a host computer for generating said data payload.

10. A method comprising:
generating a first frame comprising a data payload and an acknowledgement;

receiving via a shared-communications channel a second frame after said generating;

wherein said acknowledgement is intended as a response to said second frame and wherein, following a first frame, subsequent frames include an acknowledgement for frames requiring an acknowledgment as well as an acknowledgement for frames not requiring an acknowledgement; and one of the group consisting of coding at least one bit of said second frame, compressing at least one bit of said second frame, filtering at least one bit of said second frame and performing an application-specific operation on at least one bit of said second frame.

11. The method of claim 10 further comprising encrypting at least one bit of said first frame before said receiving.

12. The method of claim 10 further comprising transmitting via said shared-communications channel said first frame after said receiving.

13. The method of claim 10 wherein said first frame also comprises a poll.

14. The method of claim 10 wherein said second frame comprises an acknowledgement.

15. A method comprising:

generating a first frame comprising a data payload and a first acknowledgement before said transmitting of a second frame;

transmitting a second frame comprising a first poll from a first station to a second station; and transmitting said first frame from said second station to said first station; and transmitting a third frame comprising a second acknowledgement and a second poll from said first station to said second station and wherein, following a first frame, subsequent frames include an acknowledgement for frames requiring an acknowledgment as well as an acknowledgement for frames not requiring an acknowledgement and one of the group consisting of coding at least one bit of said second frame, compressing at least one bit of said second frame, filtering at least one bit of said second frame and performing an application-specific operation on at least one bit of said second frame.

16. The method of claim 15 further comprising encrypting at least one bit of said second frame before said transmitting of said second frame.

17. The method of claim 15 further comprising transferring said data payload from a host computer to said second station.

18. The method of claim 15 wherein said second frame also comprises data.

* * * * *